(12) United States Patent
Nakano et al.

(10) Patent No.: US 9,772,208 B2
(45) Date of Patent: Sep. 26, 2017

(54) THERMAL TYPE FLOWMETER WITH PARTICLE GUIDE MEMBER

(75) Inventors: Hiroshi Nakano, Tokyo (JP); Masahiro Matsumoto, Tokyo (JP); Satoshi Asano, Tokyo (JP); Keiji Hanzawa, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 522 days.

(21) Appl. No.: 14/359,161

(22) PCT Filed: Jan. 18, 2012

(86) PCT No.: PCT/JP2012/000249
§ 371 (c)(1),
(2), (4) Date: May 19, 2014

(87) PCT Pub. No.: WO2013/108289
PCT Pub. Date: Jul. 25, 2013

(65) Prior Publication Data
US 2014/0326064 A1   Nov. 6, 2014

(51) Int. Cl.
*G01F 1/692* (2006.01)
*G01F 1/684* (2006.01)
(Continued)

(52) U.S. Cl.
CPC ............ *G01F 1/692* (2013.01); *G01F 1/6842* (2013.01); *G01F 1/696* (2013.01); *G01F 5/00* (2013.01); *G01F 15/00* (2013.01)

(58) Field of Classification Search
CPC ........ G01F 1/692; G01F 1/6842; G01F 1/696; G01F 5/00; G01F 15/00; G01F 1/68
(Continued)

(56) References Cited

U.S. PATENT DOCUMENTS 4,785,662 A * 11/1988 Ohta .................. G01F 1/684
73/114.34
5,708,214 A * 1/1998 Kiguchi .............. G01F 1/3272
73/202

(Continued)

FOREIGN PATENT DOCUMENTS

JP   9-72763 A    3/1997
JP   9-236465 A   9/1997
(Continued)

OTHER PUBLICATIONS

International Search Report dated Mar. 6, 2012 with English translation (nine (9) pages).

*Primary Examiner* — Lisa Caputo
*Assistant Examiner* — Nathaniel T Woodward
(74) *Attorney, Agent, or Firm* — Crowell & Moring LLP

(57) ABSTRACT

Provided is a thermal type flowmeter in which contamination of a sensor element is reduced. The flowmeter includes a sensor element including a heating resistor formed in a thin film part, the thin film part being provided on a diaphragm formed on a substrate; a support member to locate the sensor element thereon; a secondary channel that includes part of the support member and takes in part of intake air flowing through an air intake pipeline; and a guide member provided on the support member or the sensor element that lies on a line L that extends along an air flow in the secondary channel and passing over the thin film part, the guide member allowing fine particles to be guided in a direction away from the line L, the fine particles coming together with an air flow along the surface of the support member or the sensor element.

20 Claims, 15 Drawing Sheets

(51) Int. Cl.
    *G01F 1/696*     (2006.01)
    *G01F 15/00*    (2006.01)
    *G01F 5/00*     (2006.01)

(58) Field of Classification Search
    USPC ... 73/204.26, 204.21, 202.5, 204.11, 201.16,
                            73/204.23, 204.24, 204.25
    See application file for complete search history.

(56) References Cited

U.S. PATENT DOCUMENTS

| | | | | |
|---|---|---|---|---|
| 5,804,720 | A * | 9/1998 | Morimasa | G01F 1/6845 |
| | | | | 73/202.5 |
| 7,082,825 | B2 * | 8/2006 | Aoshima | G01F 1/6842 |
| | | | | 73/204.22 |
| 8,733,166 | B2 * | 5/2014 | Ooga | G01F 1/6842 |
| | | | | 73/204.25 |
| 2003/0094041 | A1 * | 5/2003 | Iwaki | G01F 1/6842 |
| | | | | 73/204.21 |
| 2006/0144138 | A1 * | 7/2006 | Yamada | G01F 1/6845 |
| | | | | 73/204.26 |
| 2006/0266110 | A1 * | 11/2006 | Kouno | G01F 5/00 |
| | | | | 73/202.5 |
| 2008/0016959 | A1 * | 1/2008 | Nakano | G01F 1/6842 |
| | | | | 73/204.26 |
| 2011/0036157 | A1 * | 2/2011 | Opitz | G01F 1/6842 |
| | | | | 73/114.34 |

FOREIGN PATENT DOCUMENTS

| | | |
|---|---|---|
| JP | 2000-275077 A | 10/2000 |
| JP | 2003-214915 A | 7/2003 |
| JP | 2006-162631 A | 6/2006 |
| JP | 2009-505087 A | 2/2009 |
| WO | WO 2004/106863 A1 | 12/2004 |

\* cited by examiner (a)

(b)

(c)

(a)

(b)

(a)

(b)

(c)

THERMAL TYPE FLOWMETER WITH PARTICLE GUIDE MEMBER

TECHNICAL FIELD

The present invention relates to a thermal type flowmeter for measuring the flow rate of a fluid by using a heating resistor arranged in the fluid as the object of the measurement. In particular, the present invention relates to a thermal type flowmeter suitable for measuring the intake air flow or the exhaust gas flow rate of an internal combustion engine of an automobile.

BACKGROUND ART

Air flow meters of the thermal type, capable of directly measuring the mass flow rate, have become the mainstream of air flow meters for detecting the intake air flow of an internal combustion engine of an automobile or the like.

The thermal type air flow meters include those of the semiconductor type, comprising a sensor element including a heating resistor and a thermosensing resistor formed in a thin film part (some microns thick) of a semiconductor substrate (e.g., Si) formed by removing part of the semiconductor substrate. Such a thermal type flowmeter of the semiconductor type is installed in an air intake pipeline of an internal combustion engine and used for measuring a quantity of a fluid such as the flow rate of the intake air.

Although dust in the air is captured by an air cleaner arranged on the upstream side, intake air containing foreign substances, such as fine particles that cannot be captured by the air cleaner and carbon and oil diffusing from the combustion chamber's side of the internal combustion engine, flows into the air intake pipeline of the internal combustion engine. Therefore, protection of the sensor element from such foreign substances is necessary for achieving high-accuracy measurement of the intake air flow.

Conventional techniques for protecting the sensor element from the foreign substances contained in fluid include those described in Patent Documents 1 and 2. In the technique described in the Patent Document 1, intrusion of dust and collision of the dust with the sensor element are prevented by arranging an obstacle on the upstream side of the flow rate measurement device or the sensor element. In the technique described in the Patent Document 2, adhesion of liquid substances such as waterdrops to the sensor element is prevented by forming grooves and/or projections on the inner surface of a secondary channel and making the grooves, etc. capture the liquid substances.

PRIOR ART DOCUMENTS

Patent Document

Patent Document 1: JP-2003-214915-A
Patent Document 2: JP-2006-162631-A

SUMMARY OF THE INVENTION

Problem to be Solved by the Invention

An inner wall surface of the secondary channel facing the surface on which the sensor element is mounted is provided with a throttling portion for accelerating the flow velocity of the fluid and increasing the detection sensitivity of the sensor element. While the technique described in the Patent Document 1 prevents the collision of dust with the sensor element by arranging the obstacle on the upstream side of the sensor element, dust that should have been successfully separated from the sensor element by the obstacle can be deflected by the throttling portion toward the sensor element depending on the shape of the throttling portion and can collide/adhere with/to the sensor element. To avoid this problem, the throttling portion has to be formed in a gentle (less steep) shape. In this case, however, the degree of freedom of the shape of the throttling portion becomes low and the throttling portion has to be made long to some extent, which causes certain limitation on the downsizing of the thermal type flowmeter. Further, the distance from the obstacle to the sensor element is necessitated to be long and the effect of installing the obstacle cannot be achieved sufficiently since the dust deflected by the obstacle in directions separating from the installation surface of the sensor element diffuses considerably. Especially, fine particles on the order of several microns in particle diameter tend to diffuse rapidly and the effect of installing the obstacle is lessened further.

In the technique described in the Patent Document 2, the adhesion of waterdrops to the sensor element is suppressed by forming grooves, etc. on the wall surface of the secondary channel so that the waterdrops adhere to the grooves, etc. and are guided in the direction of extension of the grooves, etc. Thus, even though the technique is effective for liquid adhering to the wall surface of the secondary channel, the intended effect cannot be achieved for fine particles floating in the whole space inside the secondary channel.

As above, in the conventional techniques in which sufficient examination has not been conducted as to the relationship with the throttling portion and the protection of the sensor element from fine particles such as dust diffusing rapidly, the sensor element is contaminated with dust, etc. and measurement errors are caused by the contamination.

It is therefore the primary object of the present invention to provide a thermal type flowmeter in which the contamination of the sensor element is reduced.

Means for Solving the Problem

To achieve the above object, the present invention provides a thermal type flowmeter comprising: a sensor element including a heating resistor formed in a thin film part, the thin film part being provided on a diaphragm formed on a substrate; a support member to locate the sensor element thereon; a secondary channel which includes part of the support member and takes in part of intake air flowing through an air intake pipeline; and a guide member provided on the support member or the sensor element that lies on a line L, the line L extending along an air flow in the secondary channel and passing over the thin film part, the guide member allowing fine particles to be guided in a direction away from the line L, the fine particles coming together with an air flow along the surface of the support member or the sensor element.

Effect of the Invention

According to the present invention, a thermal type flowmeter with less contamination of the sensor element can be provided.

MODE FOR CARRYING OUT THE INVENTION

Figure 1:
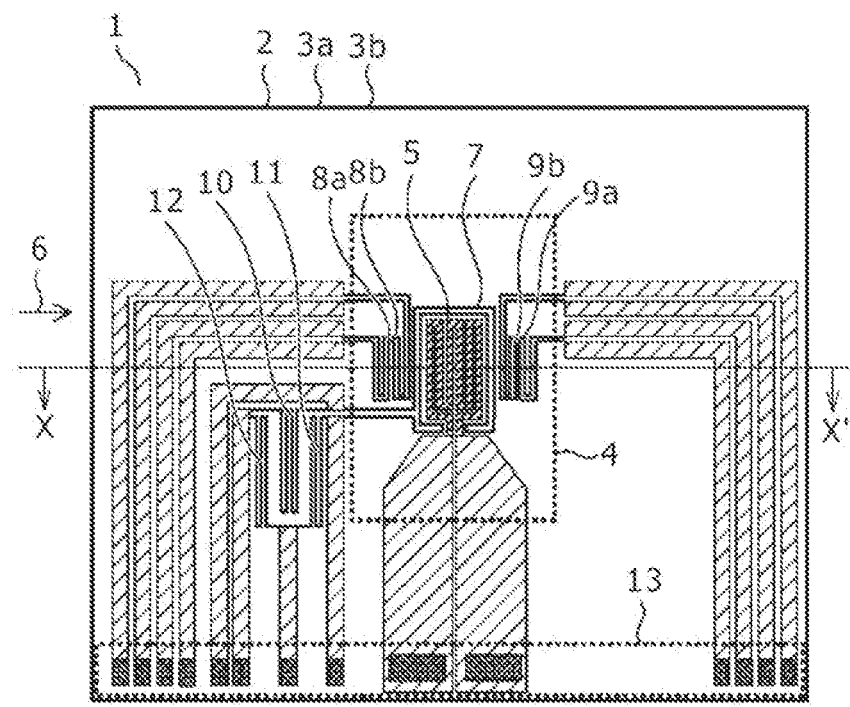
FIG. 1 is a plan view of a sensor element of a thermal type flow rate sensor in accordance with a first embodiment of the present invention.

Referring now to the drawings, a description will be given in detail of preferred embodiments in accordance with the present invention. While the explanation of each embodiment will be given by taking an example of a thermal type flowmeter that is attached to the air intake pipeline of an engine to measure the flow rate of the intake air through the air intake pipeline, each embodiment is applicable also to thermal type flowmeters for measuring other physical quantities such as the exhaust gas flow rate. In the following embodiments, identical components/parts are assigned the same reference characters in the drawings.

First Embodiment

A first embodiment in accordance with the present invention will be described below.

The configuration of a sensor element 1 of a thermal type flowmeter according to this embodiment will be explained below referring to FIGS. 1 and 2. The substrate 2 of the sensor element 1 is formed of a material having high thermal conductivity such as silicon or ceramic. A diaphragm 4 is configured by forming an electrically insulating film 3a on the substrate 2 and then forming a thin film part by etching the substrate 2 from the back side.

A heating resistor 5 is formed on a central part of the surface of the electrically insulating film 3a on the diaphragm 4. A heating temperature sensor 7 for detecting the heating temperature of the heating resistor 5 is formed to surround the heating resistor 5. The temperature of the heating resistor 5 is detected with the heating temperature sensor 7 and is controlled to be a certain temperature difference higher than the temperature of the air flow 6 (heating control). Upstream temperature sensors 8a and 8b and downstream temperature sensors 9a and 9b are formed on opposite sides of the heating temperature sensor 7. The upstream temperature sensors 8a and 8b are arranged on the upstream side of the heating resistor 5 with respect to the air flow 6, while the downstream temperature sensors 9a and 9b are arranged on the downstream side of the heating resistor 5 with respect to the air flow 6. The outermost surface of the sensor element 1 is covered with an electrically insulating film 3b. The electrically insulating film 3b serves not only for electrical insulation but also as a protective film. Arranged on a part of the electrically insulating film 3a outside the diaphragm 4 are thermosensing resistors 10, 11 and 12 whose resistance values change depending on the temperature of the air flow 6.

The heating resistor 5, the heating temperature sensor 7, the upstream temperature sensors 8a and 8b, the downstream temperature sensors 9a and 9b, and the thermosensing resistors 10, 11 and 12 are formed of materials having relatively large temperature coefficients of resistance (i.e., materials whose resistance values change greatly depending on the temperature). For example, semiconductor materials (such as polycrystalline or monocrystalline silicon doped with impurities), metallic materials (such as platinum, molybdenum, tungsten and nickel alloy), etc. are desirable for the formation of the resistors and sensors. Each of the electrically insulating films 3a and 3b is formed of silicon dioxide ($SiO_2$) or silicon nitride ($Si_3N_4$) in a thin film shape (approximately 2 μm thick) so that the thermal insulation effect is achieved sufficiently.

As explained above, the heating resistor 5, the heating temperature sensor 7, the upstream temperature sensors 8a and 8b, and the downstream temperature sensors 9a and 9b are also thermosensing resistors having the temperature dependence similarly to the thermosensing resistors 10, 11 and 12.

An electrode pad part 13 is formed in an edge part of the sensor element 1. Electrodes for connecting the resistors (constituting the heating resistor 5, the heating temperature sensor 7, the upstream temperature sensors 8a and 8b, the downstream temperature sensors 9a and 9b, and the thermosensing resistors 10, 11 and 12) to a drive/detection circuit are formed in the electrode pad part 13. The electrodes are formed of aluminum, for example.

Figure 2:
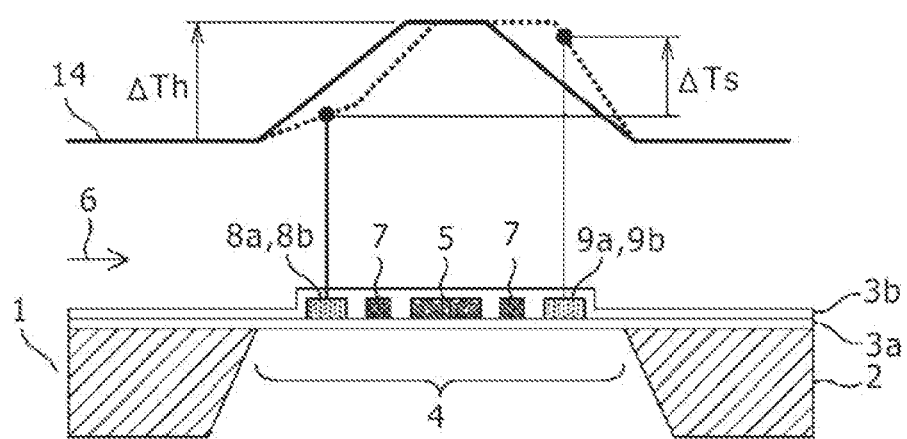
FIG. 2 is a schematic diagram showing the X-X' cross section of the sensor element 1 shown in FIG. 1 and temperature distribution.

The temperature distribution 14 in FIG. 2, shown together with the sectional configuration of the sensor element 1, is the distribution of the surface temperature of the sensor element 1. The solid line of the temperature distribution 14 indicates the temperature distribution of the diaphragm 4 in a windless state. The heating resistor 5 heats up so that its temperature is ΔTh higher than the temperature of the air flow 6. The broken line of the temperature distribution 14 indicates the temperature distribution of the diaphragm 4 when the air flow 6 has occurred. With the occurrence of the air flow 6, the temperature on the upstream side of the heating resistor 5 drops since the upstream side is cooled down by the air flow 6. The temperature on the downstream side of the heating resistor 5 rises since air after passing through and being heated by the heating resistor 5 flows into the downstream side. Thus, the measurement of the flow rate is performed by measuring the temperature difference ΔTs between the temperatures on the upstream side and the downstream side of the heating resistor 5 by use of the upstream temperature sensors 8a and 8b and the downstream temperature sensors 9a and 9b.

Next, the drive/detection circuit of the sensor element 1 will be explained below.

Figure 3:
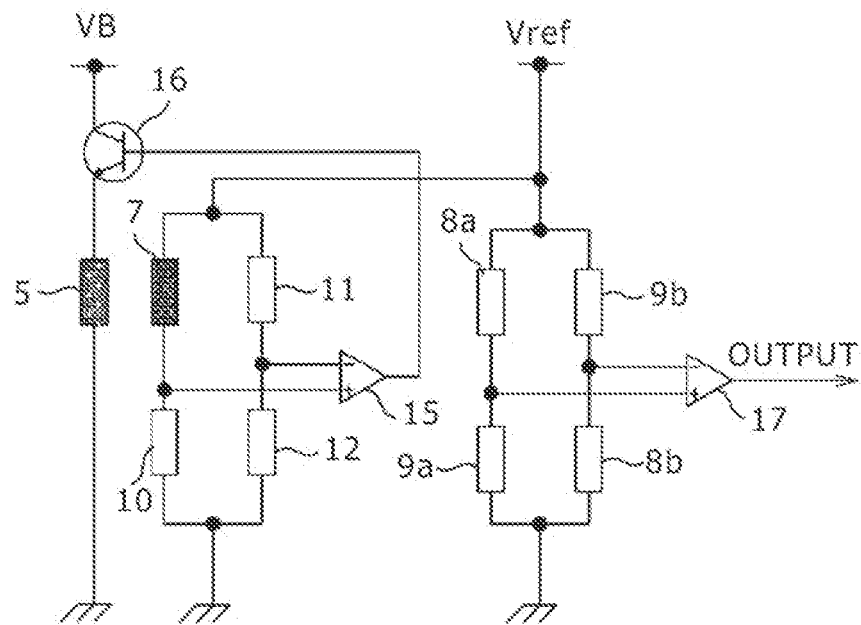
FIG. 3 is a circuit diagram showing an electric circuit for driving the sensor element 1 of FIG. 1.

As shown in FIG. 3, a bridge circuit is formed by parallelly connecting a series circuit made of the heating temperature sensor 7 and the thermosensing resistor 10 (whose resistance values change depending on the temperature of the heating resistor 5) and a series circuit made of the thermosensing resistors 11 and 12. A reference voltage Vref is applied to each series circuit. Intermediate voltages of the series circuits are extracted and inputted to an amplifier 15. The output of the amplifier 15 is inputted to the base of a transistor 16. A feedback circuit is formed by connecting the collector and the emitter of the transistor 16 to the power source VB and the heating resistor 5, respectively. With this configuration, the temperature Th of the heating resistor 5 is controlled to be higher than the temperature Ta of the air flow 6 by a certain temperature difference ΔTh (=Th−Ta).

Meanwhile, another bridge circuit is formed by parallelly connecting a series circuit made of the upstream temperature sensor 8a and the downstream temperature sensor 9a and a series circuit made of the downstream temperature sensor 9b and the upstream temperature sensor 8b. The reference voltage Vref is applied to each series circuit. When a temperature difference occurs between the upstream temperature sensors 8a and 8b and the downstream temperature sensors 9a and 9b due to the air flow, the resistance balance in the bridge circuit changes and a differential voltage occurs. An output corresponding to the air flow rate can be acquired through the detection of the differential voltage via an amplifier 17.

Next, an example of installation of the sensor element 1 and the drive/detection circuit will be described below referring to FIG. 4.

Figure 4:
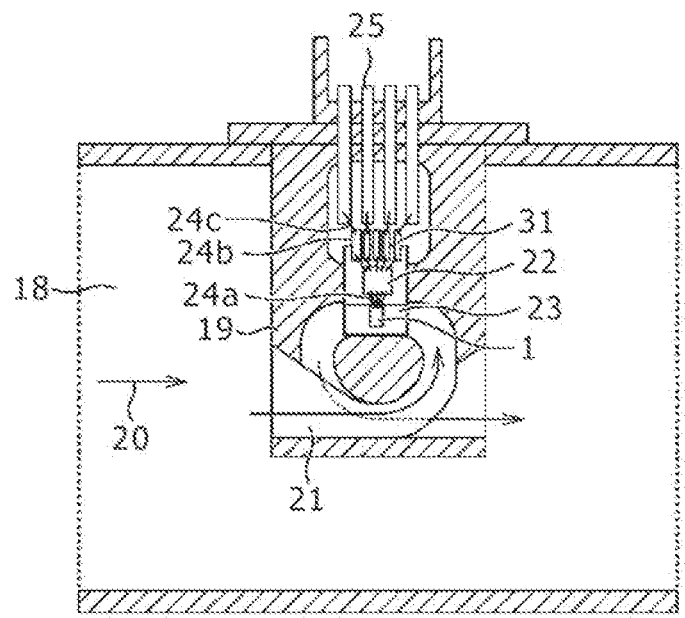
FIG. 4 is a schematic diagram showing the installation structure of the sensor element 1 of the thermal type flow rate sensor.

In FIG. 4, a base member 19 is arranged to protrude inward from the wall surface of an air intake pipeline 18. A secondary channel 21 for taking in part of the intake air 20 flowing through the air intake pipeline 18 is formed in the base member 19. While the secondary channel 21 is formed in a shape having curved parts, the shape of the channel in the vicinity of the sensor element 1 is straight. A part of a support member 23 for supporting the sensor element 1 is exposed to the inside of the secondary channel 21. The sensor element 1 is located in a rectangular concave part formed on the support member 23. The secondary channel 21 is formed in a straight shape in the part where the sensor element 1 is arranged and in curved shapes upstream and downstream of the straight part. A circuit chip 22 including the drive/detection circuit of the sensor element 1 is mounted on the support member 23. The sensor element 1 and the circuit chip 22 are electrically connected together by using gold bonding wires 24a or the like. The circuit chip 22 is electrically connected to lead members 31 by using gold bonding wires or the like. Further, terminals 25 are formed for supplying electric power to the drive circuit and for extracting output signals. The terminals 25 and the lead members 31 (electrically connected to the circuit chip 22) are connected together by using aluminum bonding wires 24c and gold bonding wires 24b.

Figure 5:
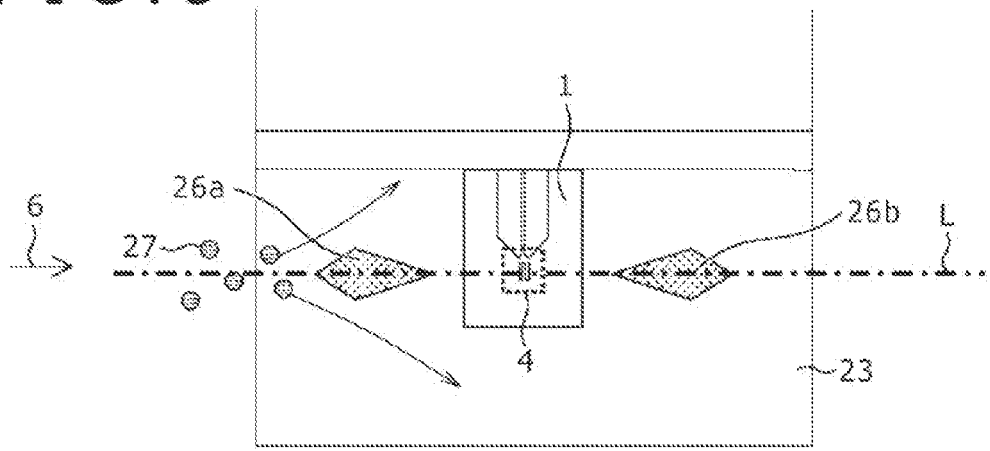
FIG. 5 is a plan view of a support member 23 according to the first embodiment of the present invention.
Figure 6:
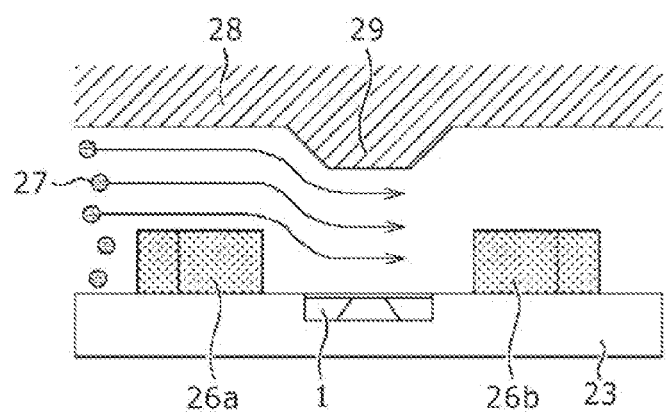
FIG. 6 is a cross-sectional view taken along a line L on the support member 23 shown in FIG. 5.

Next, the employment of guide means including obstacles 26a and 26b (arranged on parts of the support member 23 upstream and downstream of the sensor element 1) for the thermal type flowmeter comprising the sensor element for measuring the flow rate on such a flat plate-shaped surface will be explained in detail below referring to FIGS. 5 and 6.

Figure 7:
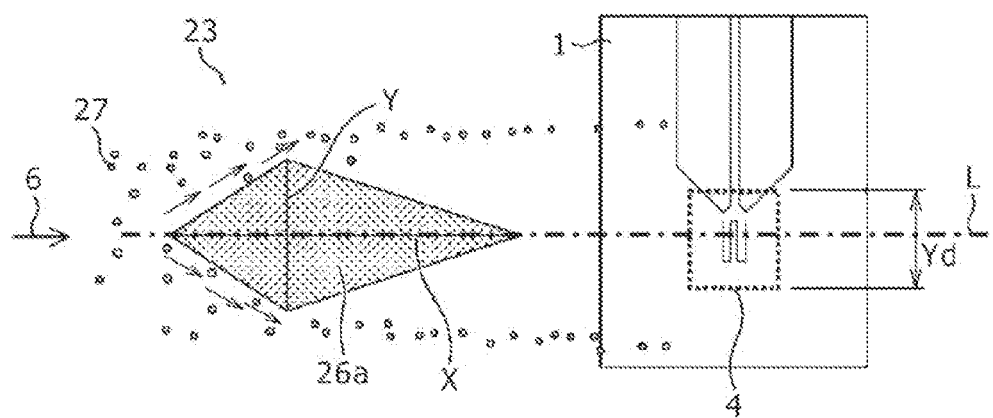
FIG. 7 is a plan view showing guide means according to the first embodiment of the present invention.

The obstacles 26a and 26b in this embodiment are prism-shaped projections (prisms each having a substantially quadrangle cross-sectional shape) protruding from the support member 23. The obstacles 26a and 26b are situated on a line L that extends along the air flow 6 in the secondary channel and passes through the diaphragm 4 of the sensor element 1. Further, the cross-sectional shape of each obstacle 26a, 26b is substantially a quadrangle, and one of the two diagonal lines of the quadrangle extends along the line L. Furthermore, the cross-sectional shape of each obstacle 26a, 26b is substantially a quadrangle, the two diagonal lines of the quadrangle differ in the length, and the longer one (diagonal line X) of the two diagonal lines extends in a direction along the line L as shown in FIG. 7. Moreover, the length of the shorter one (diagonal line Y) of the two diagonal lines is greater than the length of the diaphragm 4 of the sensor element 1. In addition, the intersection point of the two diagonal lines is situated on the upstream side of the center of the diagonal line extending along the line L.

The function of the guide means implemented by the obstacles 26a and 26b will be explained below referring to FIG. 7.

The surface of the support member 23 on which the sensor element 1 is located is substantially on the same plane as the detecting surface of the sensor element 1, or the surface above the sensor element 1 is configured to be slightly concave or convex. Thus, the support member 23 and the sensor element 1 are configured so that at least air flowing on the surface of the support member 23 passes over the surface of the sensor element 1. The obstacles 26a and 26b in this embodiment are prism-shaped projections protruding from the support member 23 and are situated on the line L extending along the air flow 6 and passing through the diaphragm 4 of the sensor element 1. Therefore, fine particles 27 coming together with the air flow 6 collide with the obstacle 26a. The fine particles 27 after the collision head in directions separating from the line L along the surface of the support member 23. In other words, the fine particles 27 after the collision come along paths avoiding the region over the surface of the sensor element 1.

Further, the cross-sectional shape of each obstacle 26a, 26b is substantially a quadrangle, and one of the two diagonal lines X and Y of the quadrangle extends in the direction along the line L. With this configuration, the side faces of each obstacle 26a, 26b with which the coming fine particles 27 collide are tilted with respect to the coming direction of the fine particles 27, facilitating the reflection (bounce) of the fine particles in the tilt directions. Further, the tilting reduces the energy of the collision of the particles with the obstacle 26a, which contributes to reduction of particles adhering to the obstacle 26a.

Furthermore, the cross-sectional shape of each obstacle 26a, 26b is substantially a quadrangle, the two diagonal lines of the quadrangle differ in the length, and the longer one (diagonal line X) of the two diagonal lines extends in the direction along the line L. With this configuration, each obstacle 26a, 26b having the shape extending along the air flow 6 is prevented from excessively disturbing the air flow 6 flowing over the sensor element 1.

Moreover, the length Y of the shorter one of the two diagonal lines is greater than the length Yd of the diaphragm 4 of the sensor element 1 measured in the direction orthogonal to the line L. With this configuration, the fine particles after being guided by the obstacle 26a can be fed to the downstream side of the sensor element 1 while preventing the fine particles from passing over the diaphragm 4. Fine particles adhering to the sensor element 1 (especially, those adhering to the diaphragm 4) tend to cause detection errors to the sensor element 1 for the following reason: The diaphragm 4 is a thin film that is some microns thick, and thus the heat capacity and the thermal conductivity of the diaphragm 4 are low. Adhesion of fine particles (some microns to some tens of microns) to the diaphragm 4 changes the temperature distribution on the diaphragm 4 and that deteriorates the detection accuracy (i.e., causes errors). Adhesion of fine particles to parts of the sensor element 1 other than the diaphragm 4 does not change the temperature of the substrate 2 of the sensor element 1 and has substantially no ill effect on the detection characteristics since the thickness of the substrate 2 is some hundreds of microns and the temperature of the substrate 2 equals the ambient temperature. Therefore, greater effect can be achieved if each obstacle 26a, 26b is shaped so that the length Y of the shorter one of the two diagonal lines is greater than the length Yd of the diaphragm 4 of the sensor element 1.

In addition, the intersection point of the two diagonal lines is situated on the upstream side (in the direction separating from the sensor element 1) of the center of the diagonal line extending along the line L. With this configuration, the cross-sectional shape of the obstacle 26a becomes substantially streamlined and the disturbance (turbulence) in the air flow downstream of the obstacle 26a can be reduced. Disturbance in the air flowing over the sensor element 1 increases the detection noise and causes flow rate detection errors. Thus, with the substantially streamlined cross-sectional shape of the obstacle 26a, a high-accuracy thermal type flowmeter, reducing the adhesion of fine particles without increasing the detection noise due to disturbance in the air flow, can be achieved.

Figure 8:
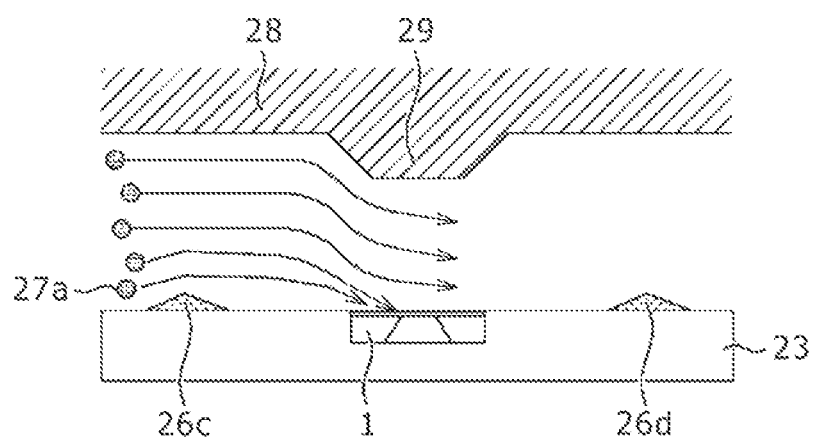
FIG. 8 is a schematic diagram showing the flow of fine particles in a conventional technology.

Next, fine particles flowing over the surface of the sensor element 1 in an example of a configuration including obstacle members 26c and 26d will be explained below referring to FIG. 8. The sensor element 1 is located in a concave part formed on the support member 23. The obstacle members 26c and 26d, according to a conventional technology, are arranged on parts of the support member 23 upstream and downstream of the sensor element 1. A throttling portion 29 is formed on a secondary channel wall 28 facing the surface of the sensor element 1. When fine particles flow through such a configuration, an effect of having the fine particles 27a separate from the surface of the support member 23, like being bounced upward by the obstacle member 26c, is achieved. However, the air flow over the sensor element 1 is compressed by the throttling portion 29 and then the fine particles 27a head for the surface of the sensor element 1 and collide/adhere with/to the sensor element surface. The amount of the fine particles 27a adhering to the sensor element 1 increases especially in cases where the level of the protrusion of the throttling portion 29 from the secondary channel wall is increased or the throttling portion 29 is narrowed at a steep angle in order to enhance the effect of the throttling portion 29.

The obstacle 26a shown in FIG. 7 differs from the conventional technology in terms of the direction of guiding the fine particles 27a. Specifically, the obstacle 26a shown in FIG. 7 is formed as guide means that gradually separates the fine particles 27 from the line L along the surface of the support member 23. Since the guided fine particles do not pass over the diaphragm 4 on the sensor element 1, there is no influence of the shape of the throttling portion on the secondary channel wall facing the sensor element 1.

Figure 9:
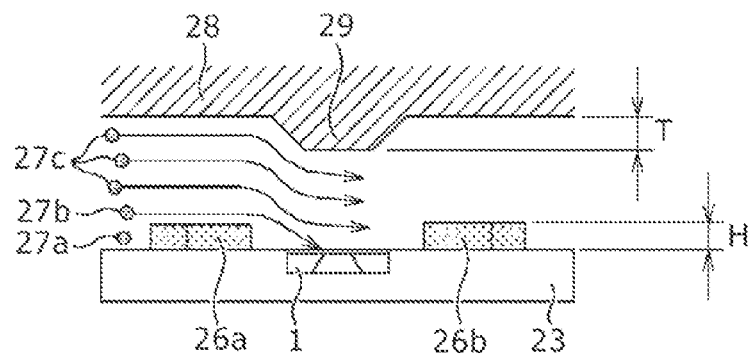
FIG. 9 is a schematic diagram showing the flow of fine particles in the first embodiment of the present invention.
Figure 9:
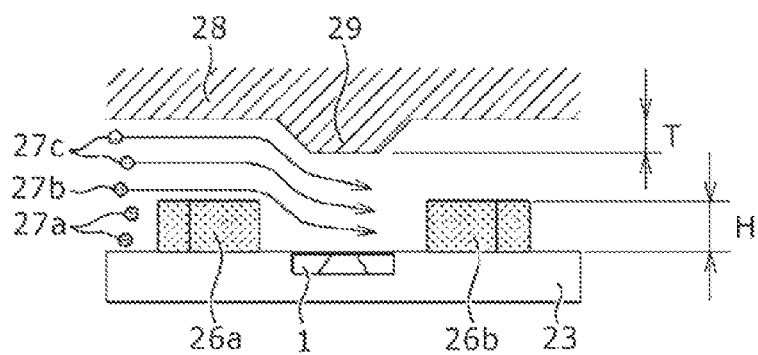
Figure 9:
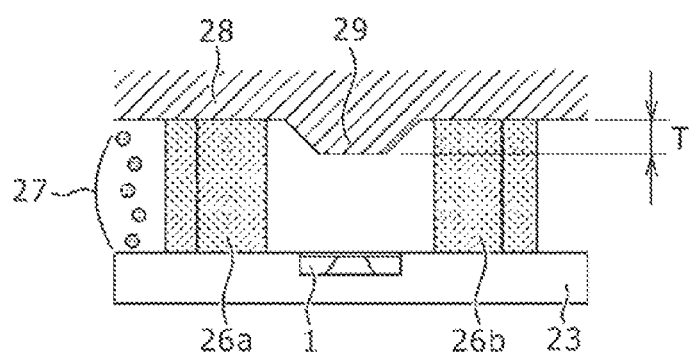

Next, more effective configurations of the obstacles 26a and 26b will be explained below. FIG. 9 is a cross-sectional view taken along the line L (see FIG. 5) extending along the air flow 6 in the secondary channel and passing through the diaphragm 4 of the sensor element 1. FIG. 9(a) shows the flow of the fine particles under a condition H<T (H: the height of the obstacles 26a and 26b from the surface of the support member 23, T: the protrusion level of the throttling portion 29 from the surface of the secondary channel wall 28). Fine particles 27a flowing in the vicinity of the surface of the support member 23 in FIG. 9(a) are obstructed by the obstacle 26a and thus do not pass over the sensor element 1. Fine particles 27b flowing at a distance H from the surface of the support member 23 flow over the obstacle 26a and then pass over the sensor element 1. Due to collision with fine particles 27c whose coming direction has been changed by the throttling portion 29, the fine particles 27b tend to head for the surface of the sensor element 1 and collide or adhere with/to the sensor element surface.

FIG. 9(b) shows the flow of the fine particles under a condition H>T. Fine particles 27a flowing in the vicinity of the surface of the support member 23 in FIG. 9(b) are obstructed by the obstacle 26a and thus do not pass over the sensor element 1. Fine particles 27b flowing at a distance H from the surface of the support member 23 flow over the obstacle 26a and then pass over the sensor element 1. Although the fine particles 27b approach the surface of the sensor element 1 due to the collision with fine particles 27c whose coming direction has been changed by the throttling portion 29, the fine particles 27b do not get into the collision or adhesion since a sufficient distance from the sensor element 1 can be secured.

The amount of fine particles adhering to the sensor element 1 changes depending on the protrusion level T of the throttling portion 29 as explained above. An effect of further reducing the adhesion of fine particles to the sensor element 1 can be achieved by at least setting the height H to be greater than the protrusion level T of the throttling portion 29.

FIG. 9(c) shows the flow of the fine particles under a condition in which the height H is increased till the obstacles 26a and 26b contact the secondary channel wall 28 or extend to the vicinity of the secondary channel wall 28. Most of the fine particles 27 heading for the sensor element 1 are obstructed by the obstacle 26a and thus do not pass over the sensor element 1. Thus, in this configuration, the protrusion level T of the throttling portion 29 has substantially no influence on the amount of adhesion.

Incidentally, while the obstacles 26a and 26b are arranged on both sides (upstream side, downstream side) of the sensor element 1 with respect to the air flow 6 in this embodiment, similar effects can be achieved even by arranging the upstream obstacle 26a only.

In the case where the obstacles 26a and 26b are arranged on both sides (upstream side, downstream side) of the sensor element 1 with respect to the air flow 6, another effect can be achieved in that the adhesion of fine particles can be reduced also when a reverse flow has occurred. Further, arranging the obstacles 26a and 26b on both sides of the sensor element 1 allows the air flow into the sensor element 1 to be identical between the case where the air flows in the normal flow direction and the case where the air flows in the reverse flow direction. Thus, the adhesion of fine particles can be reduced without deteriorating the detection accuracy of the sensor element in cases of high-amplitude pulsation (with the air flow involving reverse flows), for example.

While each obstacle 26a, 26b in this embodiment is in a shape like a quadrangular prism, the obstacle may also be formed in a tapered shape with a gradually thinned tip end. In this case, similar effects are achieved if at least the root portion of the obstacle 26a has the shape described in this embodiment.

Figure 10:
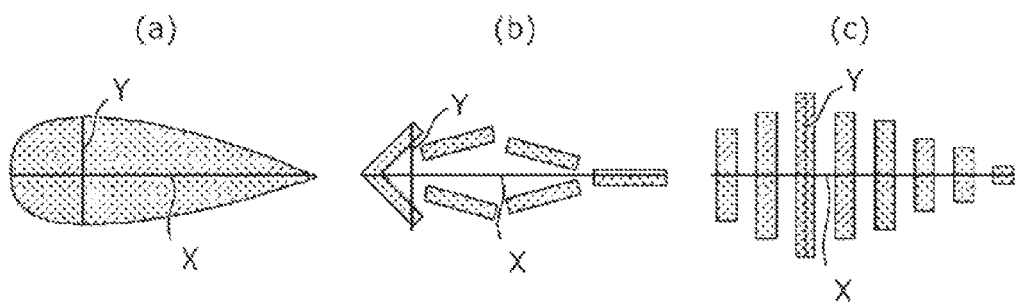
FIG. 10 is a schematic diagram showing other shapes of the guide means according to the first embodiment of the present invention.

While configurations in which the obstacle 26a has a quadrangular cross-sectional shape have been described in this embodiment, the obstacle 26a may also be formed to have a cross-sectional shape having curved lines as shown in FIG. 10(a). In this case, the line corresponding to the diagonal line X shown in FIG. 7 represents the length of the obstacle 26a in the direction of the air flow, while the line corresponding to the diagonal line Y shown in FIG. 7 represents the maximum width of the obstacle 26a in the direction orthogonal to the air flow.

While the obstacle 26a illustrated in this embodiment is a monolithic structure, the obstacle 26a may also be formed by combining a plurality of plates as shown in FIGS. 10(b) and 10(c). In this case, the line corresponding to the diagonal line X shown in FIG. 7 represents the length of the area of the obstacle 26a (where the plates are arranged) in the direction of the air flow, while the line corresponding to the diagonal line Y shown in FIG. 7 represents the maximum width of the area of the obstacle 26a (where the plates are arranged) in the direction orthogonal to the air flow.

Figure 11:
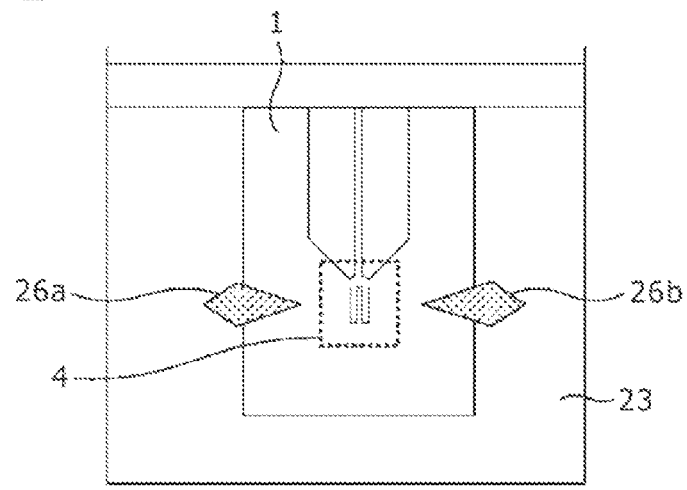
FIG. 11 is a schematic diagram showing another arrangement of the guide means according to the first embodiment of the present invention.
Figure 12:
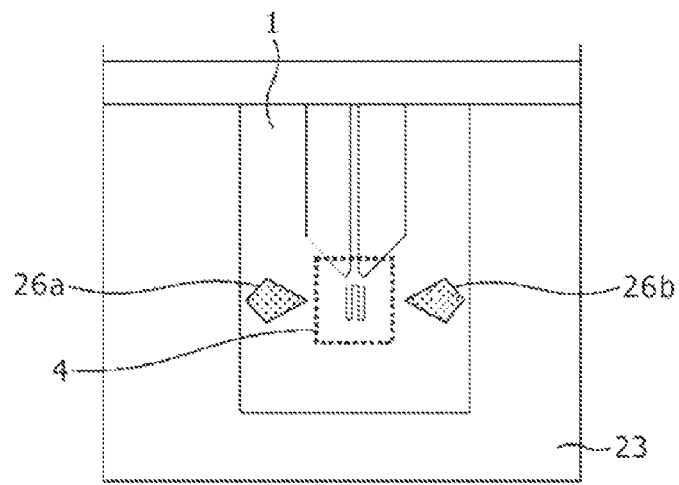
FIG. 12 is a schematic diagram showing another arrangement of the guide means according to the first embodiment of the present invention.

While configurations in which the obstacles 26a and 26b are arranged on the support member 23 have been described in this embodiment, the obstacles 26a and 26b may also be arranged to extend from the support member 23 to the surface of the sensor element 1 as shown in FIG. 11. Further, the obstacles 26a and 26b may also be formed on the sensor element 1 as shown in FIG. 12.

Second Embodiment

Next, a second embodiment in accordance with the present invention will be described below.

Figure 13:
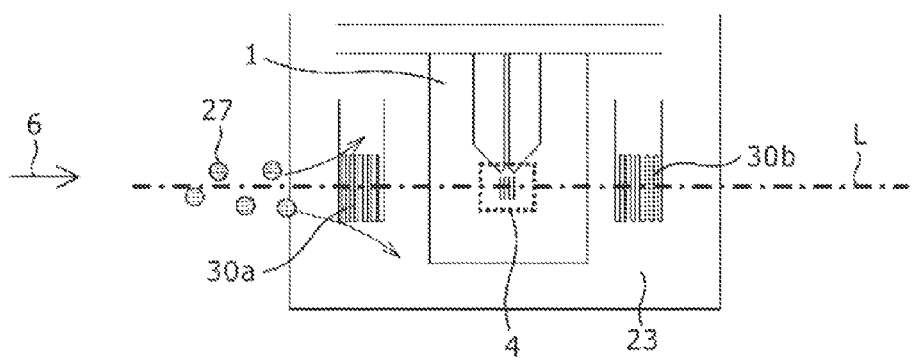
FIG. 13 is a plan view of a support member 23 according to a second embodiment of the present invention.

In this embodiment, the thermal type flowmeter comprising a sensor element for measuring the flow rate on a flat plate-shaped surface is equipped with guide means that uses temperature distribution caused by heating elements 30a and 30b arranged on parts of the support member 23 upstream and downstream of the sensor element 1 with respect to the air flow 6 as shown in FIG. 13.

In this embodiment, the heating elements 30a and 30b are provided on the support member 23. The heating elements 30a and 30b are arranged to extend in the directions of the plane of the support member 23.

Figure 14:
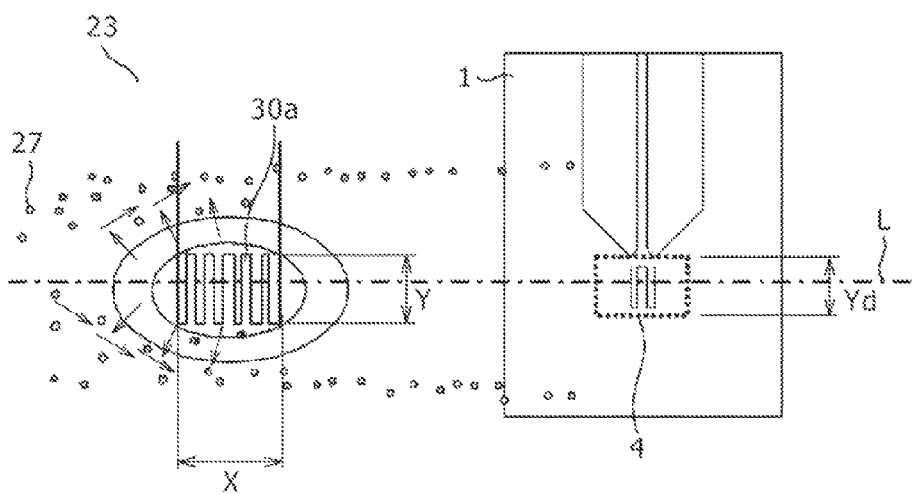
FIG. 14 is a plan view showing guide means according to the second embodiment of the present invention.
Figure 15:
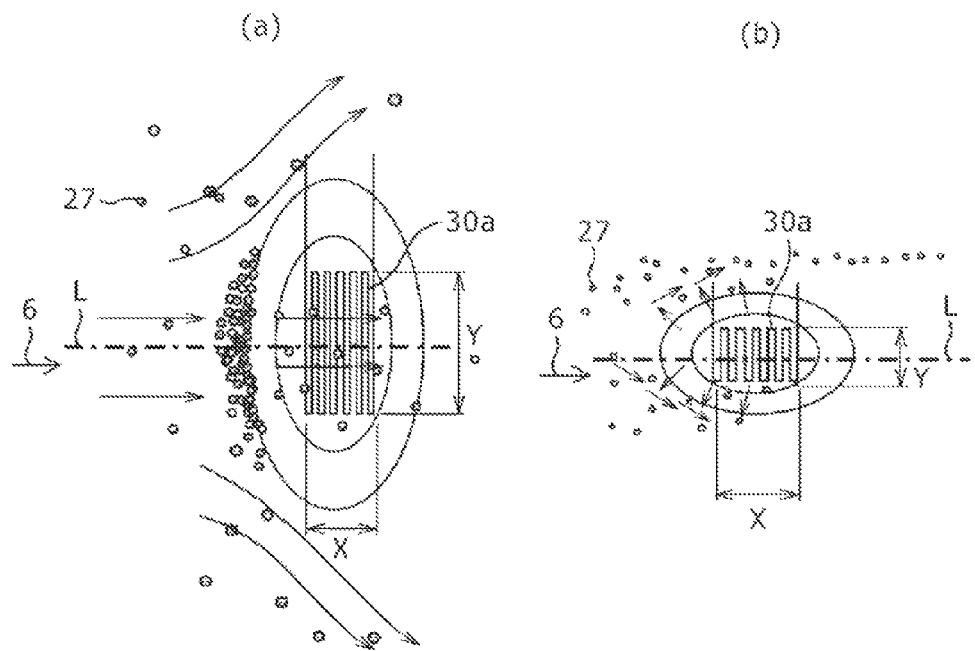
FIG. 15 is a plan view showing other shapes of the guide means according to the second embodiment of the present invention.

As shown in FIG. 14, the shape of each heating element 30a, 30b satisfies a relationship X>Y (X: the width of the heating element in the flow direction of the air flow 6, Y: the width of the heating element in the direction orthogonal to the air flow 6). The heating elements 30a and 30b are situated on a line L that extends along the air flow 6 in the secondary channel and passes through the diaphragm 4 of the sensor element 1.

The function of the guide means implemented by the heating elements 30a and 30b will be explained below referring again to FIG. 14.

The surface of the support member 23 on which the sensor element 1 is located is substantially on the same plane as the detecting surface of the sensor element 1, or the surface above the sensor element 1 is configured to be slightly concave or convex. Thus, the support member 23 and the sensor element 1 are configured so that at least air flowing on the surface of the support member 23 passes over the surface of the sensor element 1. The heating elements 30a and 30b in this embodiment are provided on the support member 23 and situated on the line L extending along the air flow 6 and passing through the diaphragm 4 of the sensor element 1. The air in the vicinity of the heating element 30a is at high temperature and thus the molecular motion of the air is highly active. Therefore, fine particles 27 coming together with the air flow 6 collide with the air (actively moving air molecules) in the vicinity of the heating element 30a and receive force in directions separating from the heating element 30a. If the heating element 30a is in a shape satisfying the relationship X>Y between the widths X and Y, the fine particles 27 after the collision with the air molecules in the vicinity of the heating element 30a can be easily guided in directions separating from the line L and along the surface of the support member 23. In other words, the fine particles 27 after the collision come along paths avoiding the region over the surface of the sensor element 1.

FIG. 15 is a schematic diagram for explaining isothermal lines (indicating the shape of the temperature distribution) and the flow of the fine particles when the aspect ratio of the heating element 30*a* is changed. FIG. 15(*a*) shows the flow of the fine particles under a condition X<Y. In this case, the temperature distribution caused by the heating element 30*a* has an elliptical shape elongated in the direction orthogonal to the flow direction of the air flow 6. When fine particles are carried by the air flow toward the heating element 30*a in such a shape, the thermal motion of the air in the vicinity of the heating element 30***a* becomes active due to the heating of the heating element 30*a* and a thermal barrier is formed. Accordingly, the adhesion of fine particles occurs along the edge of the diaphragm 4 on the upstream side of the heating element 30*a* (thermal phoresis effect). Further, increasing the heating temperature of the heating element 30*a* leads to enhancement of the thermal phoresis effect and promotion of the adhesion of fine particles.

In contrast, FIG. 15(*b*) shows the flow of the fine particles under the condition X>Y. In this case, the temperature distribution caused by the heating element 30*a* has an elliptical shape elongated in the flow direction of the air flow 6. When fine particles are carried by the air flow toward the heating element 30*a* in such a shape, the fine particles hit the thermal barrier caused by the heating of the heating element 30a and thereafter flow downstream while easily avoiding the heating element 30a.

The width Y of the heating element 30a is greater than the length Yd of the sensor element 1 in the direction orthogonal to the line L of the diaphragm 4 as shown in FIG. 14. With this configuration, the fine particles after being guided by the heating element 30a can be fed to the downstream side of the sensor element 1 while preventing the fine particles from passing over the diaphragm 4. Fine particles adhering to the sensor element 1 (especially, those adhering to the diaphragm 4) tend to cause detection errors to the sensor element 1. The diaphragm 4 is a thin film that is some microns thick, and thus the heat capacity and the thermal conductivity of the diaphragm 4 are low. Adhesion of fine particles (some microns to some tens of microns) to the diaphragm 4 changes the temperature distribution on the diaphragm 4 and that deteriorates the detection accuracy (i.e., causes errors). Adhesion of fine particles to parts of the sensor element 1 other than the diaphragm 4 does not change the temperature of the substrate 2 of the sensor element 1 and has substantially no ill effect on the detection characteristics since the thickness of the substrate 2 is some hundreds of microns and the temperature of the substrate 2 equals the ambient temperature. Therefore, greater effect can be achieved if the width Y of the heating elements 30a and 30b is greater than the length Yd of the diaphragm 4 of the sensor element 1.

Figure 16:
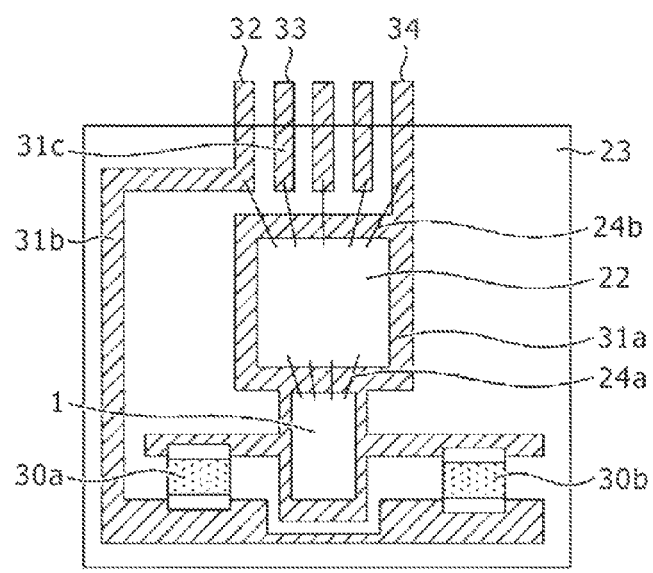
FIG. 16 is a schematic diagram showing an example of installation of the guide means according to the second embodiment of the present invention.

Next, a method for the installation of the heating elements 30a and 30b will be explained below. FIG. 16 shows the internal structure of the support member 23 in this embodiment. The sensor element 1 and the circuit chip 22 have been bonded and fixed to a lead member 31a. The sensor element 1 and the circuit chip 22 are electrically connected together by using gold bonding wires 24a. A part of the lead member 31a is exposed from the support member 23 to serve as a ground (GND) terminal 34. A part of another lead member 31b is exposed from the support member 23 to serve as a power supply terminal 32. The heating elements 30a and 30b are connected to the lead members 31a and 31b. By the connection, electric current from the power supply terminal 32 is supplied to the heating elements 30a and 30b. A part of another lead member 31c is exposed from the support member 23 to serve as an output terminal 33 for outputting a flow rate signal as the result of the detection. The circuit chip 22 is connected to the power supply terminal 32, the ground terminal 34 and the output terminal 33 by using gold bonding wires 24b.

The sensor element 1, the circuit chip 22, the heating elements 30a and 30b, and the lead members 31a-31c described above can be manufactured at a lower cost and with ease by forming them integrally by means of resin molding. In this case, the resin molding material can be used as the support member 23.

Heater materials such as carbon fiber, nickel alloy, alumina and silicon nitride are usable for the heating elements 30a and 30b. Cu-based materials (copper, copper alloy, etc.) and Fe-based materials (e.g., iron) are usable for the lead members 31a-31c. Epoxy-based sealant is used as the molding material to be used as the support member 23.

It is also possible to use a ceramic substrate as the support member 23. In this case, electrodes for the installation (mounting) of the heating elements 30a and 30b are formed on the ceramic substrate and the electrical connection is made by means of welding, soldering or the like. Since the electrode parts are made of metal, protection of the electrode parts is necessary in order to enhance the resistance to corrosion. In the case of the resin molding according to this embodiment, the heating elements 30a and 30b are protected by the molding material. Therefore, the thermal type flowmeter can be manufactured at a lower cost without the need of specially taking countermeasures against such corrosion.

Third Embodiment

A third embodiment in accordance with the present invention will be described below.

Figure 17:
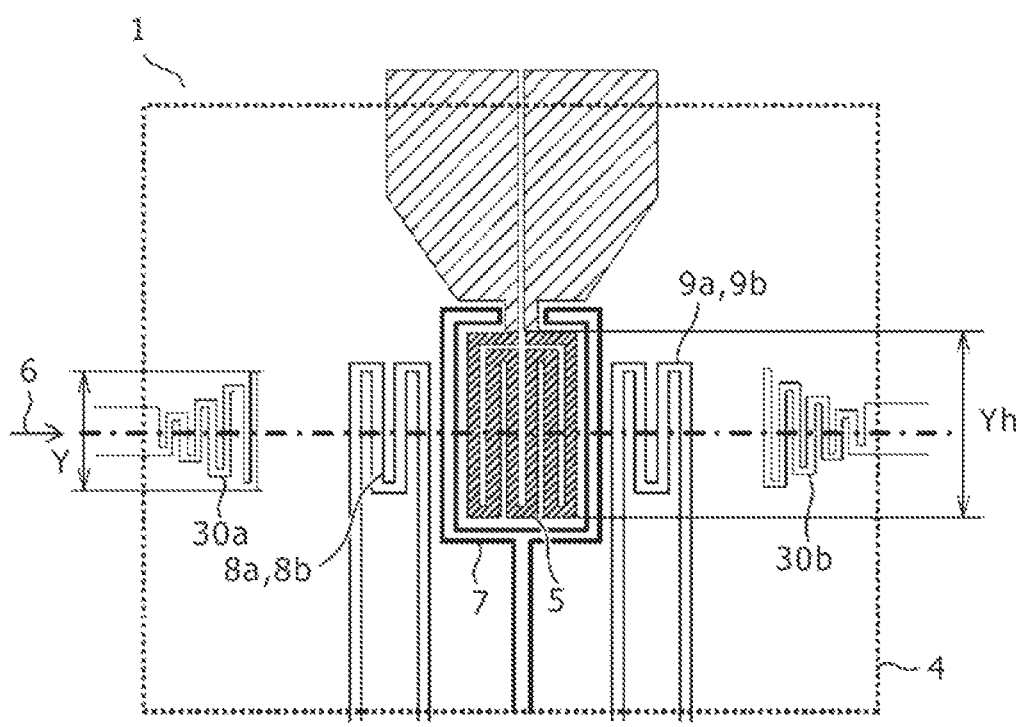
FIG. 17 is a plan view showing a diaphragm part according to a third embodiment of the present invention.

In this embodiment, the thermal type flowmeter comprising a sensor element for measuring the flow rate on a flat plate-shaped surface is equipped with guide means that uses temperature distribution caused by heating elements 30a and 30b for the upstream side of the upstream temperature sensors 8a and 8b and the downstream side of the downstream temperature sensors 9a and 9b in the diaphragm 4 of the sensor element 1 as shown in FIG. 17.

The shape of each heating element 30a, 30b satisfies a relationship Y<Yh (Y: the width of the heating element in the direction orthogonal to the air flow 6, Yh: the width of the heating resistor 5 in the direction orthogonal to the air flow 6). The heating elements 30a and 30b are situated on a line L that extends along the air flow 6 in the secondary channel and passes through the heating resistor 5 of the sensor element 1.

The function of the guide means implemented by the heating elements 30a and 30b will be explained below in contrast with a conventional configuration.

Figure 18:
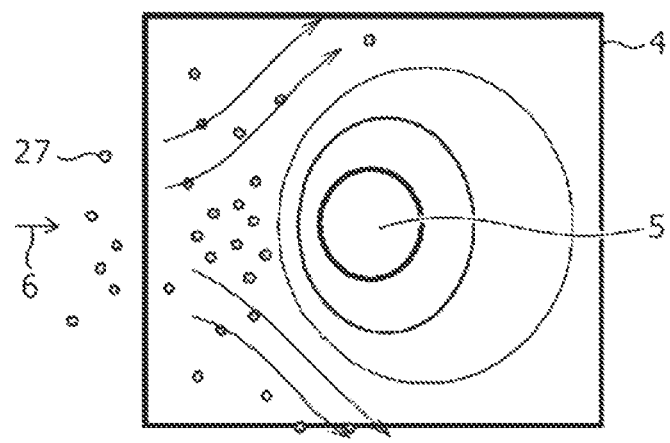
FIG. 18 is a schematic diagram showing guide means and temperature distribution on a diaphragm 4 in the third embodiment of the present invention.
Figure 18:
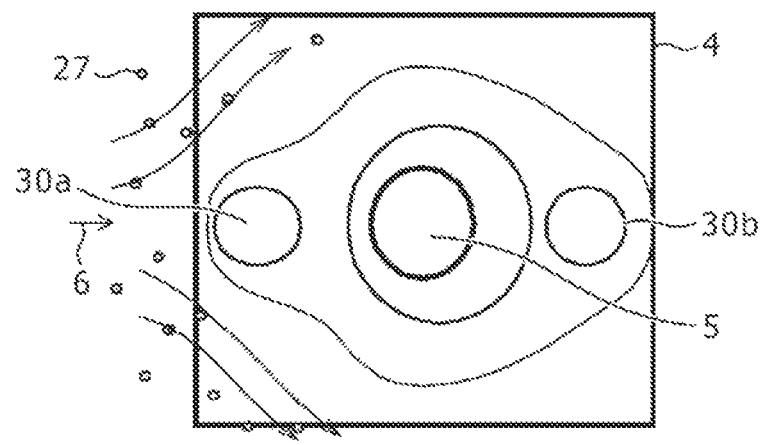

FIG. 18(a) is a schematic diagram showing isothermal lines of the temperature distribution on the diaphragm 4 and the flow of the fine particles 27 in the conventional configuration. The air in the close vicinity of the heating resistor 5 is at high temperature and thus the molecular motion of the air is highly active. When an air flow 6 occurs, the temperature on the upstream side of the heating resistor 5 drops. The fine particles 27 coming together with the air flow 6 collide with the air (actively moving air molecules) in the vicinity of the heating resistor 5 and receive force in directions separating from the heating resistor 5. The fine particles 27 enter the region over the diaphragm 4 and are obstructed when they reach the vicinity of the heating resistor 5. Therefore, the fine particles reach and adhere to the upstream part of the diaphragm 4.

FIG. 18(b) is a schematic diagram showing isothermal lines of the temperature distribution on the diaphragm 4 and the flow of the fine particles in the configuration equipped with the heating elements 30a and 30b according to the present invention. When an air flow 6 occurs, a temperature difference occurs in the vicinity of the heating resistor 5 between the upstream side and the downstream side of the heating resistor 5. Since the heating element 30a is arranged in the upstream part of the diaphragm 4, the temperature in the vicinity of the upstream edge of the diaphragm 4 becomes high even when the air flow 6 occurs. Thus, the air in the close vicinity of the heating element 30a is at high temperature and the molecular motion of the air is highly active. The fine particles 27 coming together with the air flow 6 collide with the air (actively moving air molecules) in the vicinity of the heating element 30a and receive force in directions separating from the heating element 30a. In comparison with the above conventional configuration, the amount of fine particles entering the region over the diaphragm 4 can be reduced and the adhesion of fine particles to the diaphragm 4 can be suppressed.

The shape of each heating element 30a, 30b satisfies the relationship Y<Yh (Y: the width of the heating element in the direction orthogonal to the air flow 6, Yh: the width of the heating resistor 5 in the direction orthogonal to the air flow 6). The effect of this condition will be explained below referring to FIG. 18(b) and FIG. 19.

Figure 19:
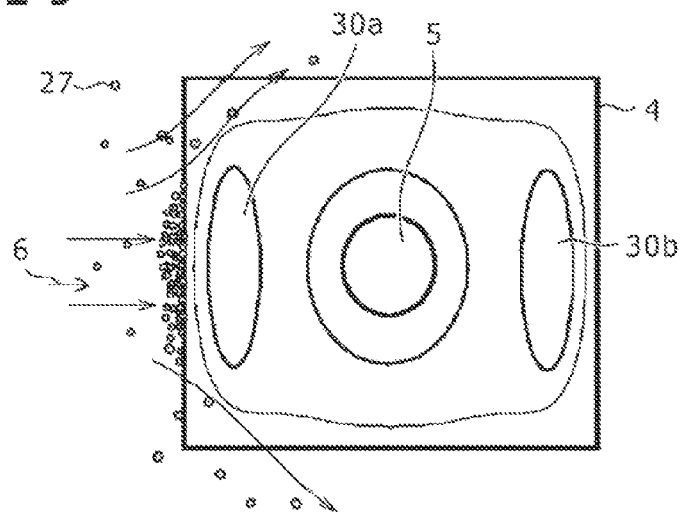
FIG. 19 is a schematic diagram showing another shape of the guide means in the third embodiment of the present invention.

FIG. 19 shows the temperature distribution under a condition Y>Yh. In this case, the temperature distribution caused by the heating element 30a has an elliptical shape elongated in the direction orthogonal to the flow direction of the air flow 6. When fine particles are carried by the air flow toward the heating element 30a in such a shape, the thermal motion of the air in the vicinity of the heating element 30a becomes active due to the heating of the heating resistor 26 and a thermal barrier is formed. Accordingly, the adhesion of fine particles occurs along the upstream edge of the diaphragm 4 (thermal phoresis effect). Further, increasing the heating temperature of the heating element 30a leads to enhancement of the thermal phoresis effect and promotion of the adhesion of fine particles. The fine particles adhering to the sensor element 1 form a level difference (bump) on the sensor element 1. The level difference disturbs the air flow and deteriorates the detection accuracy (i.e., causes errors).

FIG. 18(b) shows the temperature distribution when the shape of each heating element 30a, 30b satisfies the aforementioned condition Y<Yh. Even when the air flow 6 occurs, the temperature distribution formed by the heating elements 30a and 30b and the heating resistor 5 can maintain the elliptical shape elongated in the flow direction of the air flow 6. When fine particles are carried by the air flow toward the heating element 30a in such a shape, the fine particles hit the thermal barrier caused by the heating of the heating element 30a and thereafter flow downstream while easily avoiding the heating element 30a. Thus, if the relationship between Y and Yh satisfy the condition Y<Yh, the fine particles 27 after the collision with the air molecules in the vicinity of the heating element 30a can be easily guided in directions separating from the line L and along the surface of the support member 23. Consequently, the adhesion of fine particles to the sensor element 1 can be reduced.

Figure 20:
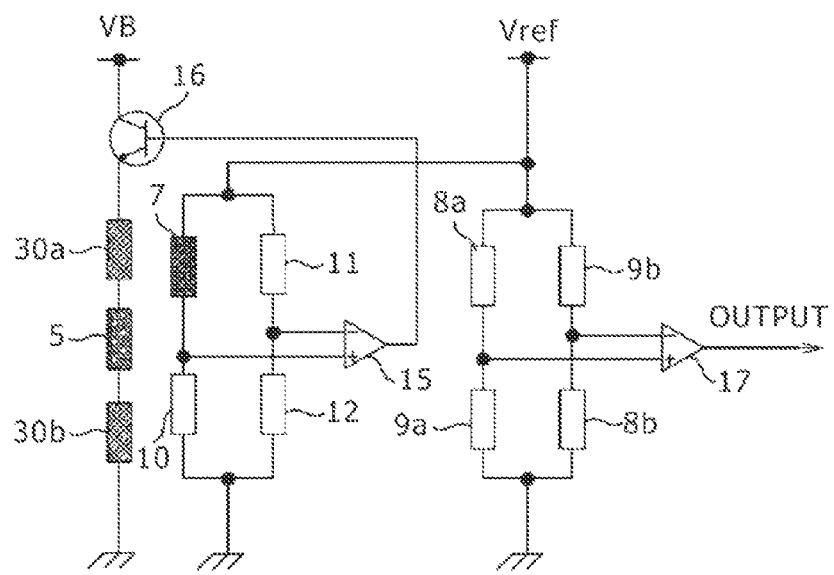
FIG. 20 is an electric circuit diagram showing a method for driving the guide means and the sensor element 1 according to the third embodiment of the present invention.

Next, a method for driving the heating elements 30a and 30b will be described below. FIG. 20 shows a drive circuit for the sensor element 1 in this embodiment. The heating elements 30a and 30b are connected in series to the heating resistor 5. Due to the series connection, the amount of heat generated by each heating element 30a, 30b changes according to the current/voltage of the heating resistor 5. The heating resistor 5 is controlled so that its current/voltage increases (in order to maintain the temperature) when the flow rate of the air flow 6 increases. As long as the connection is made so that the current/voltage applied to the heating resistor 5 is applied to the heating elements 30a and 30b, the increase in the amount of heat generation with the increase in the flow rate of the air flow 6 can be achieved also for the heating elements 30a and 30b. With such a configuration, the temperature of each heating element 30a, 30b does not drop even when the flow rate of the air flow 6 increases. Thus, the effects of this embodiment can be achieved with a simple configuration.

Incidentally, while the heating elements 30a and 30b are connected in series to the heating resistor 5 in the above explanation of this embodiment, similar effect can be achieved even by connecting the heating elements 30a and 30b in parallel to the heating resistor 5. Similar effect is achieved as long as the connection is made so that the voltage or current applied to each heating element 30a, 30b changes according to the current or voltage applied to the heating resistor 5.

It is possible to form the heating elements 30a and 30b by using the same material/films as the heating resistor 5. In this case, the heating elements 30a and 30b can be formed concurrently with the heating resistor 5, without the need of adding a new process. Further, since the connection of the heating elements 30a and 30b to the heating resistor 5 can be made on the sensor element, it is unnecessary to arrange extra electrode pads or the like. Therefore, a thermal type flowmeter capable of reducing the adhesion of fine particles can be obtained at a lower cost.

Figure 21:
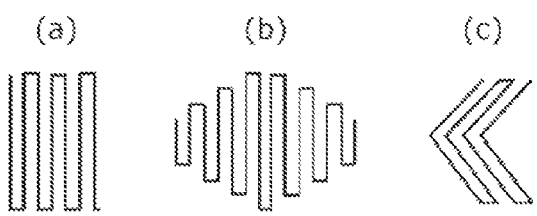
FIG. 21 is a plan view showing other shapes of the guide means according to the third embodiment of the present invention.

While the heating element 30a, 30b in this embodiment is formed in a substantially triangular shape with the width Y increasing with the approach to the heating resistor 5, the heating element may also be formed in a substantially quadrangular shape, a substantially elliptical shape, a dog-legged shape, etc. as shown in FIG. 21.

Fourth Embodiment

A third embodiment in accordance with the present invention will be described below.

Figure 22:
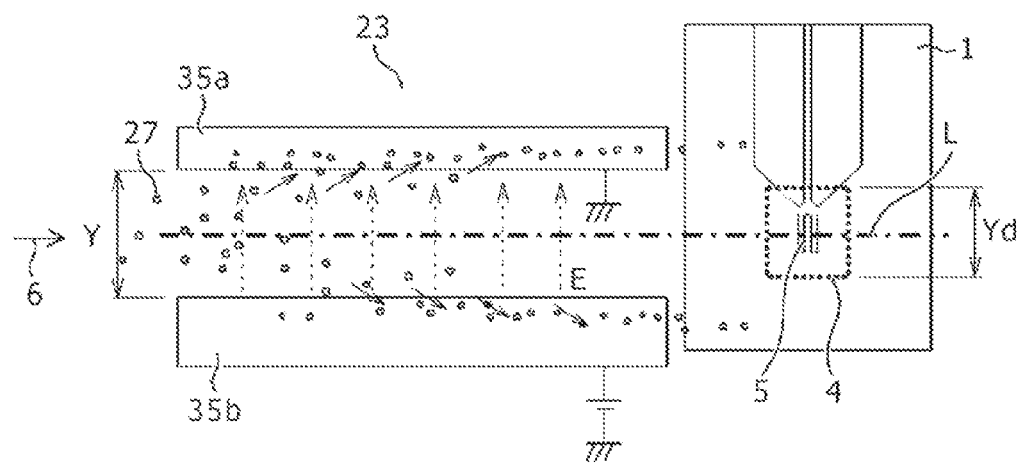
FIG. 22 is a plan view showing guide means according to a fourth embodiment of the present invention.

As shown in FIG. 22, the thermal type flowmeter comprising a sensor element for measuring the flow rate on a flat plate-shaped surface is equipped with guide means that uses electrostatic force caused by electrodes 35a and 35b arranged on parts of the support member 23 upstream and downstream of the sensor element 1 (downstream side is unshown in FIG. 22).

The electrodes 35a and 35b in this embodiment are provided on the support member 23. The electrodes 35a and 35b are arranged to extend in the directions of the plane of the support member 23. The electrodes 35a and 35b are arranged so that the distance Y between the electrodes 35a and 35b and the width Yd of the diaphragm 4 (formed in the sensor element 1) in the direction orthogonal to the flow direction of the air flow 6 satisfy Y>Yd. Further, the electrodes 35a and 35b are situated to face each other across a line L that extends along the air flow 6 in the secondary channel and passes through the diaphragm 4 of the sensor element 1.

The function of the guide means implemented by the electrodes 35a and 35b will be explained below referring to FIG. 22.

The surface of the support member 23 on which the sensor element 1 is located is substantially on the same plane as the detecting surface of the sensor element 1, or the surface above the sensor element 1 is configured to be slightly concave or convex. Thus, the support member 23 and the sensor element 1 are configured so that at least air flowing on the surface of the support member 23 passes over the surface of the sensor element 1. The electrodes 35a and 35b in this embodiment are provided on the support member 23 and arranged along the line L extending along the air flow 6 and passing through the diaphragm 4 of the sensor element 1. An electric field E occurs in the region sandwiched between the electrodes 35a and 35b. The fine particles 27 coming together with the air flow 6 have been electrically charged due to friction among the fine particles and friction with wall surfaces. Therefore, each fine particle 27 receives electrostatic force from the electric field E formed by the electrodes 35a and 35b and is guided toward the electrode 35a or the electrode 35b. In other words, each fine particle 27 is guided in a direction separating from the line L and along the surface of the support member 23. The direction in which each fine particle 27 is guided is determined by the polarity (positive or negative) of the electric charge of the fine particle 27.

The electrodes 35a and 35b are arranged so that the distance Y between the electrodes 35a and 35b and the width Yd of the diaphragm 4 (formed in the sensor element 1) in the direction orthogonal to the flow direction of the air flow 6 satisfy the condition Y>Yd. Further, the electrodes 35a and 35b are situated to face each other across the line L extending along the air flow 6 in the secondary channel and passing through the diaphragm 4 of the sensor element 1. With this arrangement, the guided fine particles flow to the downstream side of the sensor element 1 without passing over the diaphragm 4 of the sensor element 1.

Further, the following effect can be achieved by satisfying the condition Y>Yd. While the electrically charged fine particles are guided toward the electrode 35a or the electrode 35b, the fine particles can be adsorbed and accumulated on the electrode 35a or 35b depending on the types of the fine particles. The accumulation of fine particles forms a convex level difference at the position of the accumulation. The level difference disturbs the air flow. In this embodiment, even if such a level difference is caused by the accumulation of fine particles on the electrode 35a or 35b, the air flowing over the electrode 35a or 35b does not pass over the diaphragm 4. The air flow disturbed by the level difference caused by the accumulation of fine particles does not pass over the diaphragm 4. Therefore, the flow rate detection error caused by noise, etc. can be reduced. Consequently, high measurement accuracy can be maintained even in a long-term use of the thermal type flowmeter.

Figure 23:
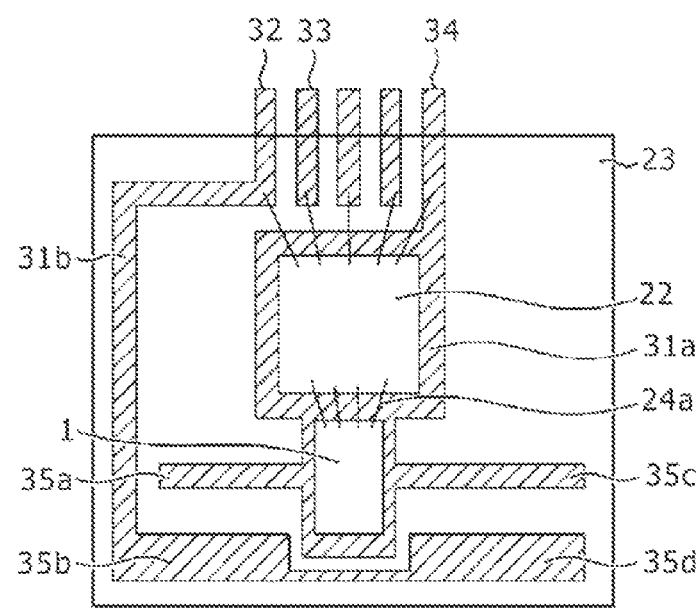
FIG. 23 is a schematic diagram showing an example of installation of the guide means according to the fourth embodiment of the present invention.

Next, a method for the installation of the electrodes 35a and 35b will be explained below. FIG. 23 shows the internal structure of the support member 23 in this embodiment. The sensor element 1 and the circuit chip 22 have been bonded and fixed to a lead member 31a. The sensor element 1 and the circuit chip 22 are electrically connected together by using gold bonding wires 24a. A part of the lead member 31a is exposed from the support member 23 to serve as a ground (GND) terminal 34. A part of another lead member 31b is exposed from the support member 23 to serve as a power supply terminal 32. The electrode 35a is formed by extending the lead member 31a (connecting with the ground terminal 34) toward the upstream side of the sensor element 1. Also on the downstream side of the sensor element 1, an electrode 35c is formed by extending the lead member 31a connecting with the ground terminal 34. Meanwhile, the electrode 35b is formed by extending the lead member 31b (connecting with the power supply terminal 32) toward the upstream side of the sensor element 1. Also on the downstream side of the sensor element 1, an electrode 35d is formed by extending the lead member 31b connecting with the power supply terminal 32.

The sensor element 1, the circuit chip 22, the lead members 31a-31c (to serve as the ground terminal 34 and the power supply terminal 32), and the electrodes 35a-35d described above can be manufactured at a lower cost and with ease by forming them integrally by means of resin molding. The electrodes 35a-35d, formed integrally with the lead members serving as the ground terminal 34 and the power supply terminal 32, can be implemented just by modifying the pattern of the lead members and thus do not increase the production cost. In this case, the resin molding material can be used as the support member 23.

Similarly to the lead members 31a and 31b, not only Cu-based materials but also Fe-based materials are usable for the electrodes 35a-35d. Epoxy-based sealant is used as the molding material to be used as the support member 23. Since the electrodes 35a-35d are made of metal, protection of the electrode parts is necessary in order to enhance the resistance to corrosion. In the case of the resin molding according to this embodiment, the electrodes 35a-35d are protected by the molding material. Therefore, the thermal type flowmeter can be manufactured at a lower cost without the need of specially taking countermeasures against such corrosion.

Fifth Embodiment

A fifth embodiment in accordance with the present invention will be described below.

Figure 24:
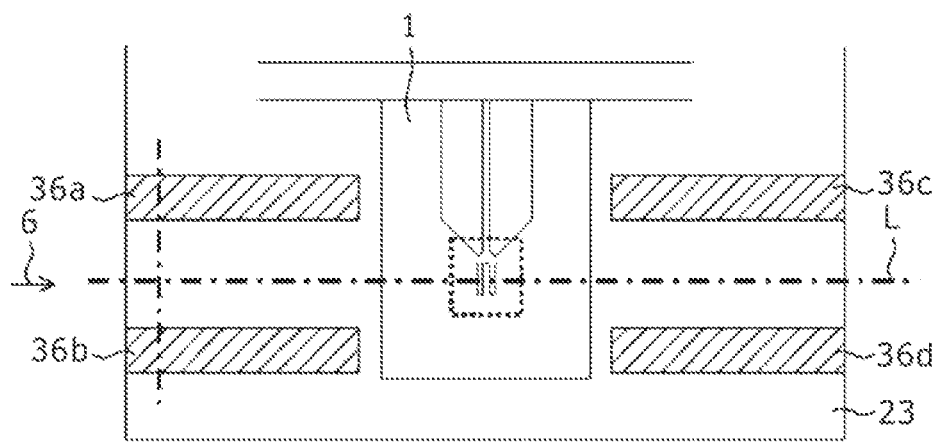
FIG. 24 is a plan view showing a support member 23 according to a fifth embodiment of the present invention.

As shown in FIG. 24, in this embodiment, the thermal type flowmeter comprising a sensor element for measuring the flow rate on a flat plate-shaped surface is equipped with guide means that uses flow velocity distribution caused by projections 36a-36d, by arranging the projections 36a-36d on parts of the support member 23 upstream and downstream of the sensor element 1.

The projections 36a and 36b in this embodiment are prism-shaped projections protruding from the support member 23. The projections 36a and 36b are arranged to extend in the directions of the plane of the support member 23. The projections 36a and 36b are arranged so that the distance Y between the projections 36a and 36b and the width Yd of the diaphragm 4 (formed in the sensor element 1) in the direction orthogonal to the flow direction of the air flow 6 satisfy Y>Yd (see FIG. 25). Further, the projections 36a and 36b are situated to face each other across a line L that extends along the air flow 6 in the secondary channel and passes through the diaphragm 4 of the sensor element 1. The same goes for the projections 36c and 36d situated on the downstream side of the sensor element 1.

Figure 25:
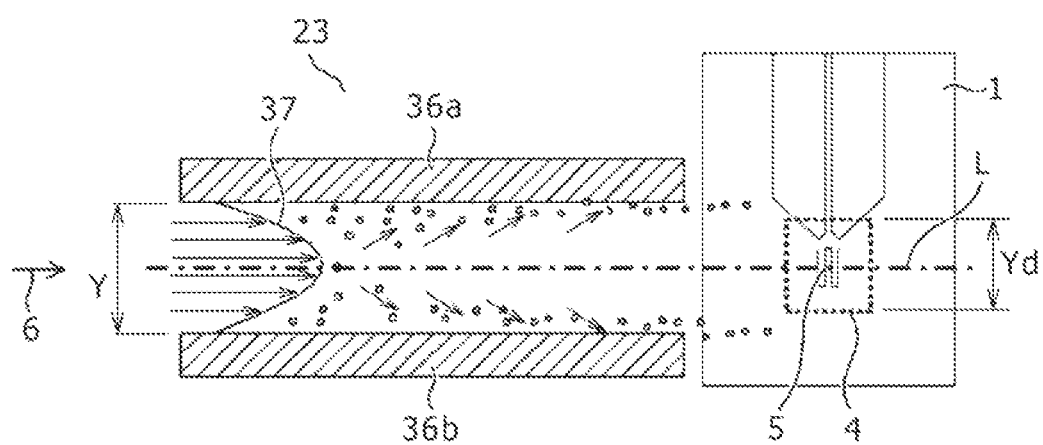
FIG. 25 is a plan view showing guide means according to the fifth embodiment of the present invention.

The function of the guide means implemented by the projections 36a and 36b will be explained below referring to FIG. 25.

The surface of the support member 23 on which the sensor element 1 is located is substantially on the same plane as the detecting surface of the sensor element 1, or the surface above the sensor element 1 is configured to be slightly concave or convex. Thus, the support member 23 and the sensor element 1 are configured so that at least air flowing on the surface of the support member 23 passes over the surface of the sensor element 1. The projections 36a and 36b in this embodiment are provided on the support member 23 and arranged along the line L extending along the air flow 6 and passing through the diaphragm 4 of the sensor element 1. In the flow velocity distribution 37 of the air flowing through the region sandwiched between the projections 36a and 36b, the flow velocity is slow in the vicinity of each projection 36a, 36b and gradually increases with the distance from each projection 36a, 36b. This flow velocity difference, which is caused by the viscosity of the air, becomes significant in cases of laminar flows at relatively low flow velocity. Each fine particle 27 coming together with the air flow 6 is guided by the flow velocity distribution 37 (formed by the projections 36a and 36b) from a high flow velocity part to a low flow velocity part. In other words, each fine particle 27 is guided in a direction separating from the line L and approaching the projection 36a or 36b along the surface of the support member 23.

The projections 36a and 36b are arranged so that the distance Y between the projections 36a and 36b and the width Yd of the diaphragm 4 (formed in the sensor element 1) in the direction orthogonal to the flow direction of the air flow 6 satisfy the condition Y>Yd. Further, the projections 36a and 36b are situated to face each other across the line L extending along the air flow 6 in the secondary channel and passing through the diaphragm 4 of the sensor element 1. With this arrangement, the guided fine particles flow to the downstream side of the sensor element 1 without passing over the diaphragm 4 of the sensor element 1.

Further, the following effect can be achieved by satisfying the condition Y>Yd. While the fine particles are guided toward the projection 36a or the projection 36b, the fine particles can be adsorbed and accumulated on the projection 36a or 36b depending on the types of the fine particles. The accumulation of fine particles forms a convex level difference at the position of the accumulation. The level difference disturbs the air flow. In this embodiment, even if such a level difference is caused by the accumulation of fine particles on the projection 36a or 36b, the air flowing over the projection 36a or 36b does not pass over the diaphragm 4. The air flow disturbed by the level difference caused by the accumulation of fine particles does not pass over the diaphragm 4. Therefore, the flow rate detection error caused by noise, etc. can be reduced. Consequently, high measurement accuracy can be maintained even in a long-term use of the thermal type flowmeter.

Figure 26:
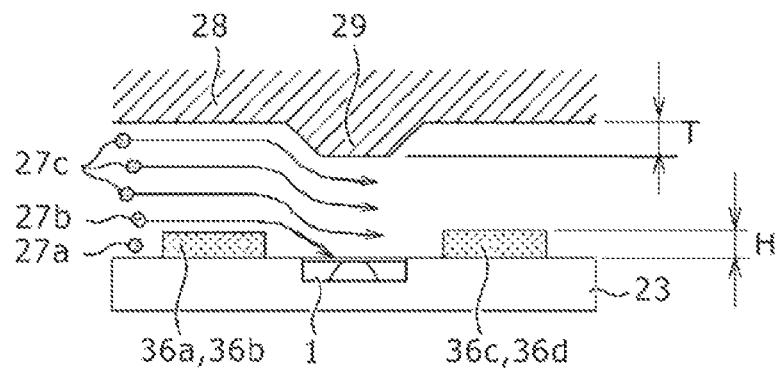
FIG. 26 is a schematic diagram showing the flow of fine particles in the fifth embodiment of the present invention.
Figure 26:
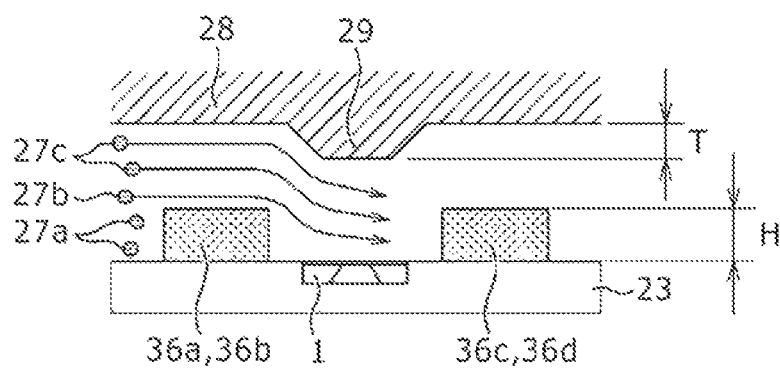
Figure 26:
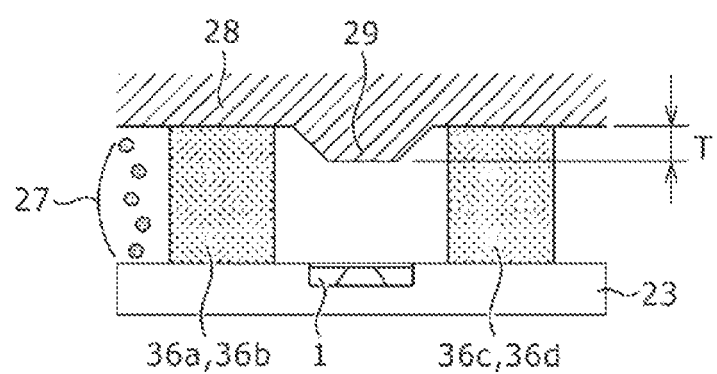

Next, more effective configurations of the projections 36a and 36b in this embodiment will be explained below. FIG. 26 is a cross-sectional view taken along the line L in FIG. 24. FIG. 26(a) shows the flow of the fine particles under a condition H<T (H: the height of the projections 36a and 36b from the surface of the support member 23, T: the protrusion level of the throttling portion 29 from the surface of the secondary channel wall 28). Fine particles 27a flowing in the vicinity of the surface of the support member 23 in FIG. 26(a) are guided by the projections 36a and 36b and thus do not pass over the sensor element 1. Fine particles 27b flowing at a distance H from the surface of the support member 23 flow over the projections 36a and 36b and then pass over the sensor element 1. Due to collision with fine particles 27c whose coming direction has been changed by the throttling portion 29, the fine particles 27b tend to head for the surface of the sensor element 1 and collide or adhere with/to the sensor element surface.

FIG. 26(b) shows the flow of the fine particles under a condition H>T. Fine particles 27a flowing in the vicinity of the surface of the support member 23 in FIG. 26(b) are obstructed by the projections 36a and 36b and thus do not pass over the sensor element 1. Fine particles 27b flowing at a distance H from the surface of the support member 23 flow over the projections 36a and 36b and then pass over the sensor element 1. Although the fine particles 27b approach the surface of the sensor element 1 due to the collision with fine particles 27c whose coming direction has been changed by the throttling portion 29, the fine particles 27b do not get into the collision or adhesion since a sufficient distance from the sensor element 1 can be secured.

The amount of fine particles adhering to the sensor element 1 changes depending on the protrusion level T of the throttling portion 29 as explained above. An effect of further reducing the adhesion of fine particles to the sensor element 1 can be achieved by at least setting the height H to be greater than the protrusion level T of the throttling portion 29.

FIG. 26(c) shows the flow of the fine particles under a condition in which the height H is increased till the projections 36a and 36b contact the secondary channel wall 28 or extend to the vicinity of the secondary channel wall 28. Most of the fine particles 27 heading for the sensor element 1 are obstructed by the projections 36a and 36b and thus do not pass over the sensor element 1. Thus, in this configuration, the protrusion level T of the throttling portion 29 has substantially no influence on the amount of adhesion.

Incidentally, while the projections 36a and 36b and the projections 36c and 36d are arranged on both sides (upstream side, downstream side) of the sensor element 1 in this embodiment, similar effects can be achieved even by arranging the upstream projections 36a and 36b only. If the projections are arranged on both sides (upstream side, downstream side) of the sensor element 1, the adhesion of fine particles can be reduced also when a reverse flow has occurred. Further, arranging the projections on both sides of the sensor element 1 allows the air flow into the sensor element 1 to be identical between the case where the air flows in the normal flow direction and the case where the air flows in the reverse flow direction. Thus, the adhesion of fine particles can be reduced without deteriorating the detection accuracy of the sensor element in cases of high-amplitude pulsation (with the air flow involving reverse flows), for example.

Figure 27:
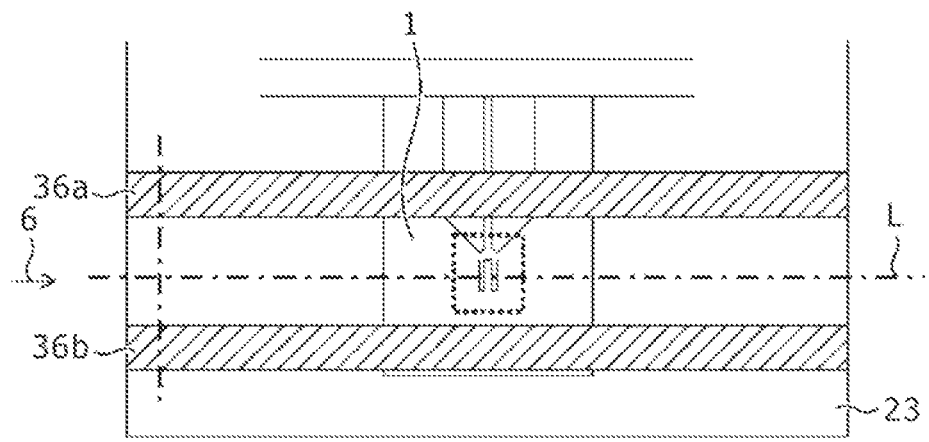
FIG. 27 is a plan view showing another shape of the support member 23 according to the fifth embodiment of the present invention.

While configurations in which the projections 36a and 36b are arranged on the support member 23 have been described in this embodiment, the projections 36a and 36b may also be arranged to extend along the support member 23 through the sensor element 1 as shown in FIG. 27.

DESCRIPTION OF REFERENCE CHARACTERS

1: sensor element
2: substrate
3a-3c: electrically insulating film
4: diaphragm
5: heating resistor
6: air flow
7: heating temperature sensor
8a, 8b: upstream temperature sensor
9a, 9b: downstream temperature sensor
10, 11, 12: thermosensing resistor
13: electrode pad part
14: temperature distribution
15, 17: amplifier
16: transistor
18: air intake pipeline
19: base member
20: intake air
21: secondary channel
22: circuit chip
23: support member
24a, 24b: gold bonding wire
24c: aluminum bonding wire
25: terminal
26a, 26b: obstacle
27, 27a: fine particle
28: secondary channel wall
29: throttling portion
30a, 30b: heating element
31a: lead member
32: power supply terminal
33: output terminal
34: GND terminal
35a-35d: electrode
36a-36d: projection
37: flow velocity distribution

The invention claimed is:
1. A thermal type flowmeter comprising:
a sensor element including a heating resistor formed in a thin film part, the thin film part being provided on a diaphragm formed on a substrate;

a support member, the sensor element being mounted directly on the support member; and a secondary channel which includes part of the support member and takes in part of intake air flowing through an air intake pipeline, wherein the secondary channel comprises a guide member that is formed directly on the support member or the sensor element that lies on a line L, the line L extending along an X-axis that corresponds to a direction of an air flow in the secondary channel and passing over the thin film part, the guide member has a height that extends away from the support member along a Z-axis that is orthogonal to the X-axis, the guide member in cooperation with an inner surface of the secondary channel guides particles in a direction away from the line L in the surface of the support member or the sensor element along a Y-axis that is orthogonal to the Z-axis and to the X-axis, and the particles coming together with an air flow along the surface of the support member or the sensor element.

2. The thermal type flowmeter according to claim 1, wherein the guide member is provided on the upstream side and the downstream side of the heating resistor with respect to the flow of the air flow.

3. The thermal type flowmeter according to claim 1, wherein the guide member is a projection in a shape of a convex part protruding from the support member.

4. The thermal type flowmeter according to claim 3, wherein:

the cross-sectional shape of the projection in a plane parallel to the surface on which the sensor element is located is a quadrangle, and one of two diagonal lines of the quadrangle extends in a direction along the line L.

5. The thermal type flowmeter according to claim 4, wherein:

the two diagonal lines differ in the length, and the longer one of the two diagonal lines extends in the direction along the line L.

6. The thermal type flowmeter according to claim 4 wherein the intersection point of the two diagonal lines is situated along the line L separating the sensor element.

7. The thermal type flowmeter according to claim 5, wherein the length of the shorter one of the two diagonal lines is greater than the length of the thin film part in the direction orthogonal to the line L.

8. The thermal type flowmeter according to claim 3, wherein:

a wall surface of the secondary channel facing the support member's surface on which the sensor element is located is provided with a throttling portion which protrudes from the wall surface, and height H of the convex part from the surface of the support member and protrusion level T of the throttling portion satisfy a relationship H>T.

9. The thermal type flowmeter according to claim 1, wherein the guide member is a heating element provided on the support member.

10. The thermal type flowmeter according to claim 9, wherein the heating element is shaped so that width X of the heating element in the flow direction of the air flow and width Y of the heating element in the direction orthogonal to the air flow satisfy X>Y.

11. The thermal type flowmeter according to claim 10, wherein the heating element is shaped so that the width Y and length Yd of the thin film part in the direction orthogonal to the line L satisfy a relationship Y>Yd.

12. The thermal type flowmeter according to claim 1, wherein the guide member is a heating element provided on the sensor element.

13. The thermal type flowmeter according to claim 12, wherein the heating element is shaped so that width Y of the heating element in the direction orthogonal to the air flow and width Yh of the heating resistor in the direction orthogonal to the air flow satisfy Y<Yh.

14. The thermal type flowmeter according to claim 12, wherein the heating element and the heating resistor are electrically connected together in series or in parallel.

15. The thermal type flowmeter according to claim 1, wherein the guide member is implemented by an electric field which is formed by an electrode part provided on the support member.

16. The thermal type flowmeter according to claim 15, wherein:

the electrode part includes a first electrode part and a second electrode part, and the first electrode part and the second electrode part are arranged to face each other across the line L.

17. The thermal type flowmeter according to claim 16, wherein distance Y between the first electrode and the second electrode and width Yd of the thin film part in the direction orthogonal to the flow direction of the air flow satisfy Y>Yd.

18. The thermal type flowmeter according to claim 1, wherein:

the guide member includes a first protruding part and a second protruding part provided on the support member, and the first protruding part and the second protruding part are arranged to face each other across the line L.

19. The thermal type flowmeter according to claim 18, wherein distance Y between the first protruding part and the second protruding part and width Yd of the thin film part in the direction orthogonal to the flow direction of the air flow satisfy Y>Yd.

20. The thermal type flowmeter according to claim 18, wherein:

a wall surface of the secondary channel facing the support member's surface on which the sensor element is located is provided with a throttling portion which protrudes from the wall surface, and height H of the first and second protruding parts from the surface of the support member and protrusion level T of the throttling portion satisfy a relationship H>T.

* * * * *